United States Patent [19]

Heins

[11] 3,983,218
[45] Sept. 28, 1976

[54] METHOD FOR DRY REMOVAL OF SULFUR DIOXIDE FROM FURNACE FLUE, COAL AND OTHER GASES

[76] Inventor: Sidney M. Heins, 6033 N. Sheridan Road, Chicago, Ill. 60660

[22] Filed: Sept. 11, 1972

[21] Appl. No.: 287,781

Related U.S. Application Data

[63] Continuation-in-part of Ser. No. 90,618, Nov. 18, 1970, abandoned.

[52] U.S. Cl. ............................... 423/244; 423/532
[51] Int. Cl.² ............................................. B01J 8/00
[58] Field of Search ............. 423/244, 532; 55/82; 75/116, 25

[56] References Cited
UNITED STATES PATENTS

| 931,515 | 8/1909 | Sprague | 423/244 |
|---|---|---|---|
| 1,498,168 | 6/1924 | Hill | 423/532 |
| 3,374,085 | 3/1968 | Stone | 75/25 X |
| 3,436,192 | 4/1969 | Karlsson | 423/244 |
| 3,492,083 | 1/1970 | Lowicki et al. | 423/244 |
| 3,669,617 | 6/1972 | Lowicki et al. | 423/244 |

FOREIGN PATENTS OR APPLICATIONS

| 396,969 | 8/1933 | United Kingdom |
|---|---|---|

Primary Examiner—G. O. Peters
Attorney, Agent, or Firm—Chas. W. Rummler

[57] ABSTRACT

A process using run-of-the-mill flue dust from open hearth and basic oxygen steel making processes having certain iron-zinc values as a sulfur dioxide absorbent and pollutant control for industrial and public utility furnace flue gases, which materials, upon solid dry injection into a chemical reaction zone of an industrial or public utility furnace in an amount in excess over stoichiometric, results in substantial dry removal of the sulfur dioxide therefrom, and from which reaction products are cleaned by conventional gas cleaning apparatus.

4 Claims, 1 Drawing Figure

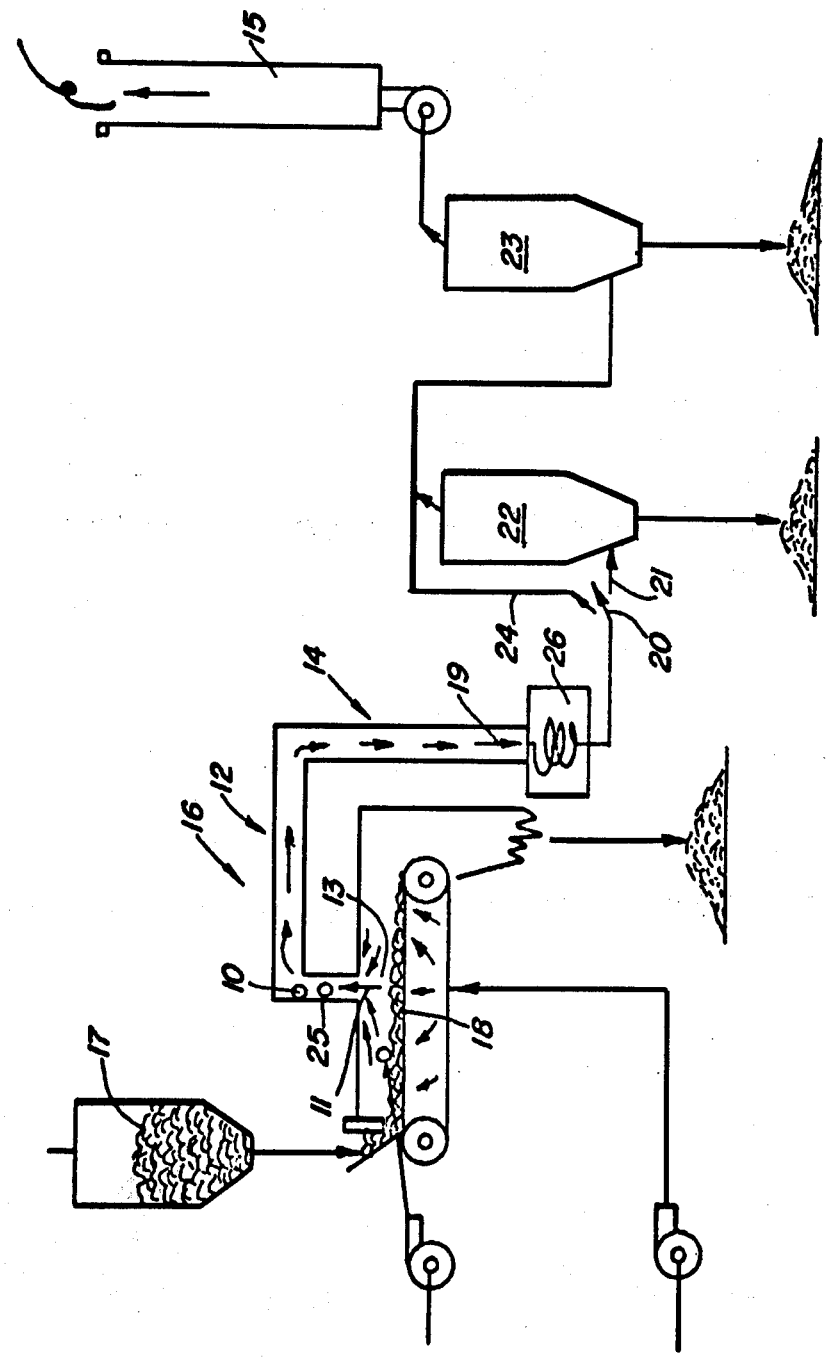

METHOD FOR DRY REMOVAL OF SULFUR DIOXIDE FROM FURNACE FLUE, COAL AND OTHER GASES

BACKGROUND OF THE INVENTION

This application is a continuation-in-part of my application Ser. No. 90,618, filed Nov. 18, 1970, now abandoned.

Source control in the pure sense deals with the elimination, before or during ultimate consumption, of potential air contaminants contained in raw materials. A classic example of this definition is the removal of all sulfur from raw coal and crude petroleum. The sulfur is collected in a pile at the mine for byproduct use.

Control of ambient air pollution must strike a compromise in all but a few cases. Thus, in coal and petroleum, the effort to remove unwanted sulfur is now distributed along the line from raw materials sources to ultimate consumer. Some sulfur is removed at the mine and well; more sulfur is removed at the washery and the refinery; the remaining sulfur is discharged to the atmosphere or otherwise handled by the ultimate consumer in accordance with his local requirements and regulations. As much sulfur as is feasible can be converted to hydrogen sulfide in some processing operations and used to manufacture sulfuric acid. The remaining sulfur can be burned and the resulting mixture of sulfur dioxide and flue gases be scrubbed and discharged at high velocity through a tall stack.

The high standard of living of the United States is due in large part to the strong upward trend in industrial production. The air pollution started at the time when the effort put into industrial production began to rise faster than the effort to control air pollution. When an air pollution threshold is reached, this invention considers the control of pollution at the source by using tools such as improved chemical reactions, processes, products and operating techniques. Threshold crossings occur when the capacity of the atmosphere to disperse the air contaminants from manmade sources has been exceeded.

The effect of industrialization has been to increase the emission of all types of sulfur compounds to the atmosphere. By far the largest mass emission consists of sulfur dioxide generated by the oxidation of raw sulfur compounds in all types of fuel combustion and in ore refining. Sulfur is almost always present with petroleum, gas and coal as found in the raw state. The total sulfur released to the atmosphere in the United States each year is about double the mass consumed for industrial manufacture and processing.

Gaseous impurities are emitted into the air in tremendous quantities. For example, sulfur dioxide occurs in the contaminated atmospheres of cities at concentrations up to several parts per million (by vol.). It produces acidity in rain water and fog and is a major source of corrosion of buildings and metal objects. A power station burning 5,000 tons of coal per day may discharge 500 tons of sulfur dioxide into the air.

A familiar result of sulfur compound combustion is the formation of a blue haze at or near the tops of flue stacks. This haze is caused by the oxidation to sulfur trioxide of 1-5 percent of the sulfur under normal conditions of excess air usage. The sulfur trioxide is hydrated by water vapor in the stack gas or in the atmosphere to form aerosols of sulfuric acid. These aerosols are in such particle size range that they appear blue against a dark background.

Blue haze has been reduced in a number of ways. Leaks of fuel gas through the brick work of one furnace contained 60 percent of the sulfur as sulfur trioxide compared with 1-5 percent of the sulfur as sulfur trioxide in stack flue gas. This high percentage is due to the catalytic effect of the refractory surface and can be eliminated easily by holding proper draft pressure on the firebox. Firebox additives such as dolomite ($CaCO_3 \cdot MgCo_3$) or hydrated lime ($Ca(OH)_2$) are used for reducing blue haze. In sulfur dioxide removal from flue gas by oxidation of the dioxide to the trioxide, the sulfur trioxide formed is removed by electrostatic precipitation.

Of the processes currently available for the removal of sulfur dioxide from furnace flue gas originating from the combustion of coal, physically regenerative cycles are adaptable only to conditions where the sulfur dioxide concentration in the stack gases is relatively high and where it is acceptable not to remove all of the sulfur dioxide. Again, the chemically regenerative cycles are unsatisfactory, even though applicable to high concentrations of sulfur dioxide in the flue gas and resulting in complete removal thereof, because they are uneconomic. The only really economic sulfur dioxide removal processes available are non-regenerative. These processes generally give complete removal of the sulfur dioxide from the flue gas but they are somewhat limited to handling concentrations of sulfur dioxide below 1 percent.

In general, current non-regenerative sulfur dioxide absorbents are lime, the carbonates of calcium and magnesium or dolomite, all of which are mined products costing in excess of $17 per ton. Sulfur dioxide adsorption by activated carbons and molecular sieves have been shown commercially feasible. However, absorptive methods are preferred to adsorptive means because of greater process efficiency.

There is thus an established need for an industrial furnace flue gas sulfur dioxide removal process which utilizes a low cost, readily available, dry, pulverulent material which can be directly injected into the furnace flue gas system without further processing by standard, commercially available injection equipment, which chemically precipitates a separable product which can be disposed of by commercially available gas cleaning apparatus and which, without the introduction of expensive stack-gas cooling equipment, results in the substantial and environmentally acceptable removal of the sulfur dioxide from the furnace flue gas.

SUMMARY OF THE INVENTION

In a process for the removal of sulfur dioxide from the flue gas of an industrial or public utility furnace, it is economically essential that the sulfur dioxide absorbent be a dry, pulverulent material which can be injected into the furnace by conventional dry materials handling equipment which, upon chemical combination with the sulfur dioxide at termperatures not requiring expensive stackgas cooling equipment, produces a particulate reaction product which likewise can be cleaned from the flue gas and disposed of by conventional gas cleaning equipment.

In the past, high chimneys have been utilized for the dispersal of waste gases from basic oxygen and open hearth basic oxygen and open hearth steel making furnaces, but the use of oxygen in recent years, while speeding up the steel making, causes rapid boiling of the charge and the emission of dense brown smoke or flue dust as it is commonly called. This smoke or fume consists chiefly of ferrite, iron oxide, manganese oxide, zinc oxide, and manganese, nickel and zinc-ferrite, finely divided to a dust of approximately 150 to 200 mesh, creating not only a disposal problem but also an air pollution hazard for industry. The composition of a typical flue dust from open hearth and basic oxygen steel making furnaces has up to 60% iron and 5–30% zinc in various chemical combinations and in addition, small amounts of the oxides of calcium, magnesium, silicon and aluminum. From 60–90 percent of the available zinc is in the form of zinc-ferrite, which comprises 3–27 percent of a typical flue dust from a steel making operation. The rest of the zinc is in the form of zinc oxide. The manganese and nickel ferrites are present in the flue dust but in relatively minor quantities.

The air pollution hazard is currently objectionable to the point that it is now a standard requirement that in steel making where there is a regular or appreciable use of oxygen for refining of steel, a high efficiency gas cleaning plant must be installed, e.g. electrostatic precipitators, to remove this obnoxious precipitation dust. The recovery of iron values from this waste product is limited and prohibitive in cost so that the extra burden of gas cleaning has heretofore been a total economic liability. It is conservatively estimated that over one million tons of this flue dust is piled at various locations over continental U.S.A. occupying valuable real estate and polluting the atmosphere and destroying the ecology. It has no known economic value at this time.

Much research has been conducted to find a means to convert this waste product to a useful byproduct having a net positive economic value, resulting in the discovery of a definite use for this flue dust in connection with the removal of sulfur dioxide from coal and other industrial flue gases.

The gist of this invention lies in the use of run-of-the-mill flue dust from steel making furnaces as a dry absorbent of sulfur dioxide from flue gases emitted from the furnaces of industrial or public utility power plants. By injecting the flue dust into a chemical reaction chamber downstream of a furnace where the temperature is between 800° and 1800° and where the oxidation of the sulfur in the furnace fuel to sulfur dioxide is complete, chemical reaction between the constituents in the flue dust and the sulfur dioxide in the furnace flue gases reduces the sulfur dioxide and precipitates reaction products therefrom which are extractable as dry particulate solids or liquids, and in the process the sulfur dioxide has been substantially removed from the furnace gases.

It is thus the primary object of this invention to establish a furnace flue gas sulfur dioxide removal process which utilizes low cost, readily available byproduct of steel making as a chemical reactant which can be injected into the furnace as a dry pulverulent material by standard commercially available dry materials furnace injection equipment, which precipitates separable chemical reaction products which can be handled by commerically available gas cleaning and materials handling equipment.

These and other desirable and important objects inherent in and encompassed by the invention will be more readily understood from the ensuing description and the appended claims.

DESCRIPTION OF THE FLOW SHEET

The accompanying flow sheet schematically shows the sequence of steps employed in carrying out a preferred embodiment of the invention, which embodiment is described below in considerable detail.

DESCRIPTION OF THE PREFERRED EMBODIMENT

In this invention, the byproduct of basic oxygen and open hearth steel-making furnace or flue dust, comprising dry pulverulent ferrite, ferric oxide, zinc oxide, and the ferrites of manganese, nickel, and zinc, which are finely divided to approximately 150 to 200 mesh, is injected in an amount in excess over stoichiometric through ports 10 into the flue gas stream 11 in a chemical reaction chamber 12. Chemical reaction chamber 12 is connected to the outlet end of a combustion chamber 13 of a public utility or industrial furnace 16, which further connects with a smoke pipe 14 leading to a stack 15 which exhausts to the atmosphere. Coal is supplied to the furnace 16 from a hopper 17. Sulfur dioxide gas in the reaction chamber 12 originates from the burning of coal in the combustion chamber 13 of furnace 16 above the stoker bed 18 at 800°–1800°F. This sulfur dioxide is readily absorbed in part by the ferrites in the steel-making dust which is injected into chamber 12 to form ferrous sulfide which is a dry black powder precipitate and sulfur trioxide which is a dry gas at the temperatures involved. The ferric oxide in the dust which is injected into chamber 12 is a dry red powder which stoichiometrically reacts incompletely with sulfur dioxide at the same prevailing temperature to precipitate dry bluish-black magnetic oxide of iron and also give off dry sulfur trioxide into smoke pipe 14.

In the case of the zinc oxide in the flue dust which is injected into reaction chamber 12 at 800°–1800°F. in the presence of a stoichiometric quantity of sulfur dioxide, the reaction is likewise incomplete giving an equilibrium in concentrations of zinc oxide, dry sulfur dioxide gas and dry reaction product zinc sulfite.

These chemically incomplete stoichiometric reactions can be rendered complete and all the sulfur dioxide removed from flue gas 11 if an excess amount of said reactants over the stoichiometric amounts is injected into chamber 12. By diverting the flue gas stream by means of valve 20 to inlet pipe 21 and activating cooler 26, an electrostatic precipitation means 22 removes the solid sulfur trioxide reaction product therefrom as a particulate liquid at 45°C. or a particulate solid at 17°C. The other dry ferrous sulfide and the dry magnetic oxide of iron reaction products are cleansed from the flue gas by conventional gas cleaning apparatus and disposed of by conventional dry fly ash recovery means 23.

Where directional control valve 20 diverts the flue gas stream 19 to pipe 24, bypassing electrostatic precipitation equipment 22, and cooler 26 is deactivated, the flue dust from steel making which is injected into the flue gas stream 11 in reaction chamber 12 in an amount in excess over stoichiometric will result in substantial removal of the sulfur dioxide from the flue gas 11. In this case, zinc ferrite in the flue dust is most active in the sulfur dioxide absorption process reacting substantially without producing sulfur trioxide and as long as enough flue dust from steel making is injected into the flue gas stream 11, sufficient zinc ferrite will be present to absorb most of the sulfur dioxide present therein without objectionable formation of sulfur trioxide therefrom. Zinc ferrite is stable at and does not decompose in the range of 1650° F. and is free to react chemically with the sulfur dioxide inthe chemical reaction chamber 12 at the temperatures involved. The reaction products of zinc ferrite which are injected in the chemical reaction chamber 12 with the sulfur dioxide therein at a temperature of 800°–1800°F. are dry solid zinc sulfite and ferric oxide which are extractable by conventional gas cleaning apparatus and dry fly wash recovery means 23.

Where no expensive cooler 26 is used. The flue gas emitting from stack 15 is substantially free of sulfur dioxide. The small amount of sulfur trioxide emitting from stack 15 is immediately cooled to atmospheric temperature and precipitates locally over the adjacent landscape as a fine powder or liquid mist.

I claim:

1. A method for the dry removal of sulfur dioxide from flue gas of a furnace having a chemical reaction chamber to which the flue gas at a temperature in the range of 800 to 1800°F. flows from a fuel combustion zone, using as a chemical reactant run-of-the-mill flue dust from open hearth and basic oxygen steel-making process, comprising the combination steps of:

a. injecting an amount of the dry flue dust into the flue gas in the chemical reaction chamber at least sufficient for the substantial absorption of the sulfur dioxide therein, and b. cleaning the resulting chemical reaction products from the flue gas.

2. A method for the complete dry removal of sulfur dioxide from furnace flue gas as set forth in claim 1 in the course of which sulfur trioxide is produced wherein the cleaning of the chemical reaction products from the flue gas comprises the steps of:

a. cooling the flue gas to a temperature sufficient to precipitate the sulfur trioxide as a powder, and b. dry cleaning said sulfur trioxide powder therefrom.

3. A method for the complete dry removal of sulfur dioxide from furnace flue gas as set forth in claim 1 wherein the cleaning of the chemical reaction products comprises the steps of:

a. cooling the flue gas to a temperature sufficient to precipitate liquid sulfur trioxide, and b. wet cleaning said liquid sulfur trioxide therefrom.

4. A method for the substantial dry removal of sulfur dioxide from furnace flue gas as set forth in claim 1 wherein the cleaning of the chemical reaction products comprises dry cleaning the chemical reaction products therefrom.

* * * * *